June 20, 1939.                    E. D. DALL                    2,162,702
                              LOCK MECHANISM
                          Filed Feb. 28, 1936          4 Sheets-Sheet 3

Inventor
Edward D. Dall.
by Charles F. Mills Attys.

Inventor
Edward D. Dall.

Patented June 20, 1939

2,162,702

UNITED STATES PATENT OFFICE 2,162,702

LOCK MECHANISM

Edward D. Dall, North Chicago, Ill., assignor to Walter F. Wright, Shaker Heights, Cleveland, Ohio Application February 28, 1936, Serial No. 66,149

3 Claims. (Cl. 70—149)

This invention relates to locks for the doors of automotive vehicles for individually controlling the doors in the usual manner but designed especially for cooperation in a locking controlling system for simultaneous locking or unlocking thereof from some point on the automotive vehicle within easy reach of the driver. The invention also involves improved cooperation and inter-control of the outer and the inner latch or lock operating handles of the vehicle doors so that locking may be readily accomplished from either the outside or the inside of the vehicle.

The lock structures of the present invention may be readily and efficiently utilized in locking controlling systems such as disclosed in my copending application Serial No. 655,180 filed February 4, 1933 or in my copending application Serial No. 716,306 filed March 19, 1934, the main purpose of the present invention being to provide improved and simplified structure and assembly so that the locks may be durable and economically manufactured and installed.

The locking structure of my invention is fully disclosed on the accompanying drawings, in which drawings

Figure 7 is a top view of the inside handle mechanism shown in Figure 1;

Figures 1, 2:
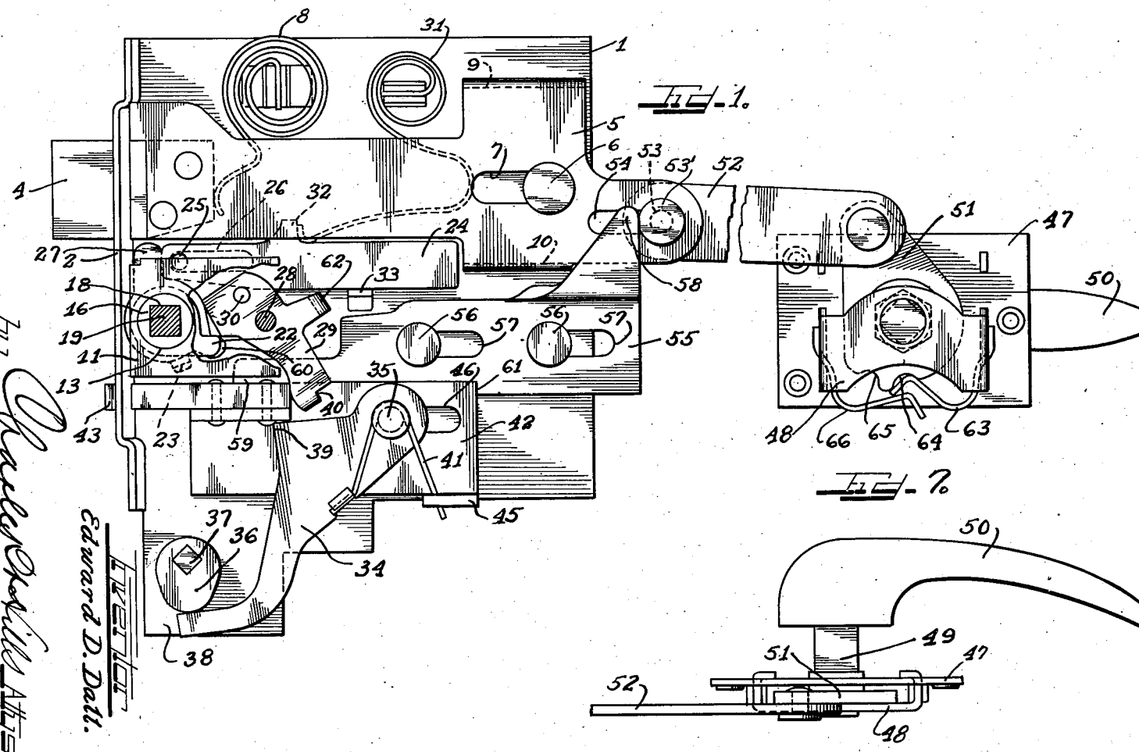
Figure 1 is a side elevation of a master lock and the inside handle mechanism associated therewith.
Figure 2 is an outside end view of the master lock of Figure 1.
Figure 2:
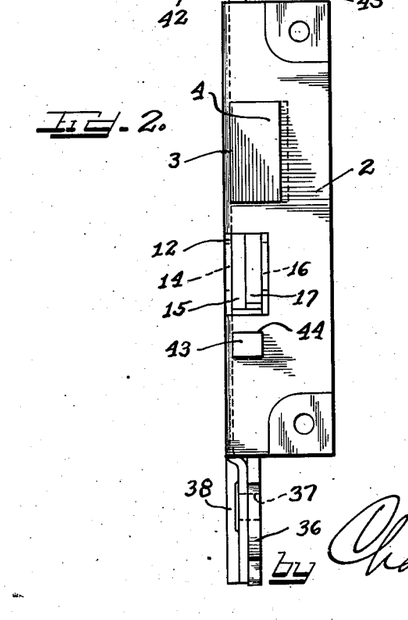
Figure 3:
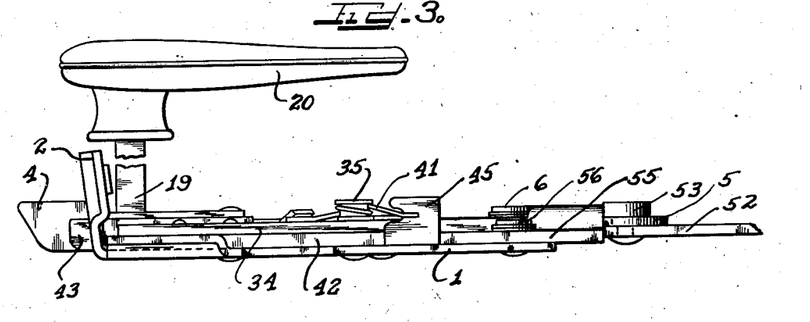
Figure 3 is a bottom end view of the master lock of Figure 1.

The lock structure disclosed on Figures 1, 2, and 3 constitutes a master lock assembly from which the locking system of a vehicle will be controlled, and this locking assembly would preferably be on the right front door of an automotive vehicle. The door latching and locking mechanism is mounted on a supporting plate 1 adapted to be secured inside of the door and having the outer flange 2 thereon for engaging against the outer edge of the door, this flange being slightly inclined from the plate as best shown in Figure 3. The flange has the rectangular opening 3 for passage of the bevelled latch bolt head 4 secured to the plate 5 slidable on the supporting plate 1 and guided by a post 6 extending from the supporting plate through the longitudinal slot 7 in the latch plate. A spring 8 engages against the inner end of the latch bolt head and tends to hold the latch structure in its outer latching position. The latch plate at its inner end is widened and has rearwardly projecting guide flanges 9 and 10 engaging the supporting plate 1.

Below the latch bolt structure and adjacent to the flange 2, a cover plate 11 is spaced a distance from but secured to the supporting plate 1. The supporting plate 1 and the cover plate 11 have aligned openings 12 and 13. The opening 12 journals the hub 14 on the roll-back member 15 while the opening 13 journals the hub 16 on the cam member 17, these members being side by side between the supporting wall 1 and the cover plate 11. The cam member has the rectangular axial passage 18 for receiving the rectangular shank 19 extending from the outer door handle 20 so that when the handle is turned the cam will turn therewith. The roll-back member has a cylindrical axial opening 21 through which the handle shank extends. The cam member has a cam tooth 22 for cooperation with an abutment lug 23 extending from the roll-back member.

Slidable and swingable on the supporting wall 1 below the latch bolt structure is a retractor bar 24 having a pin 25 at its outer end extending through a guide slot 26 in the wall 1 parallel with the movement of the latch bolt structure. An arm 27 extends upwardly from the roll-back member in alignment with the outer end of the retractor bar so that when the roll-back member is rotated in clockwise direction (Figure 1) the retractor bar will be shifted longitudinally, and when the retractor bar is in normal position its inner end will be in front of the lower flange 10 on the latch bolt plate 5 so that the bar may communicate the rotation of the roll-back member to the plate 5 for retraction of the latch bolt structure. The roll-back member is rotated in clockwise direction when the handle 29 is turned in the same direction and the tooth 22 on the cam member engages with the lug 23 on the roll-back member.

Inwardly of the roll-back and cam members, a pin 28 is journalled in the wall 1 and cover plate 11 and carries a cam lever 29 on which is mounted a cam pin 30 for engaging with the underside of the retractor bar 24 when the lever 29 is turned in clockwise direction, such turning being effected by engagement of the cam tooth 22 with the lever 29 when the cam member 17 is turned in counter-clockwise direction by the handle 20. Upon such turning of the cam lever, the pin 30 will cause the retractor bar to be swung upwardly a sufficient distance to carry its inner end above the flange 10 on the latch bolt plate 5 so as to free the retractor bar from the latch bolt structure and prevent retraction of the latch bolt structure when the retractor bar is shifted inwardly by clockwise turning of the roll-back member. A spring 31 mounted on the wall 1 engages at its lower end against the top of the retractor bar and against a lug 32 on the bar and tends to hold the bar downwardly against a stop 33 and in its outer normal position with the bar pin 25 against the outer end of the slot 26.

Below the cam lever 29 a locking lever 34 is pivoted at its upper end on a post 35 extending from the supporting wall 1, the lower end of the locking lever being in the path of a cam 36 carried by a shank or bar 37 which is journalled in the extension 38 depending from the wall 1. The shank or bar 37 extends to the outside of the door on which the lock structure is applied and the turning of the shank is preferably controlled by a suitable key lock, preferably of the cylinder and tumbler type. The locking lever 34 has a stop shoulder 39 for cooperating with the shoulder 40 at the lower end of the cam lever 29. On Figure 1 the lock structure is shown in unlocked condition, the shank 37 having been turned to engage the cam 36 with the locking lever 34 so as to withdraw the shoulder 39 from the path of the cam lever. When it is desired to lock the latch bolt structure against retraction by the retractor bar 24 the key is first turned to cause the cam 36 to be swung away from the lower end of the locking lever 34 so that the lever may be swung upwardly by a spring 41 to bring its shoulder 39 into the path of the cam lever. The handle 20 is then turned a short distance in counter-clockwise direction for engagement of the cam member 17 with the cam lever 29 for clockwise rotation of the cam lever and upward swing of the retractor bar to its locking position, that is to a position which frees it from the latch bolt structure. As the cam lever is turned its lower end glides past the lever 34 so that the lever may be swung upwardly by the spring 41 for setting of its shoulder 39 in the path of the shoulder 40 to thereby lock the cam lever in set position. The latch bolt structure cannot now be retracted from the exterior of the door on which the lock structure is applied as clockwise turning of the handle 20 will result only in longitudinal inward shift of the retractor bar past the abutment flange 10 without retraction of the latch bolt. To unlock the structure to permit retraction of the latch bolt by the outer handle 20 the key is turned to engage the cam 36 with the locking lever for downward swing of the lever and withdrawal thereof from the cam lever 29, the spring 31 then returning the retractor bar to its normal or unlocking position, the downward swing of the retractor bar, by its engagement with the cam pin 30, causing the cam lever 29 to be swung back to its normal position. Now upon turning of the handle 20 in clockwise direction the roll-back member 15 will shift the retractor bar 24 inwardly against the abutment flange 10 and the latch bolt structure will be retracted.

Besides controlling the retraction of the latch bolt in the master lock (Figure 1) the cam lever 29 functions also to control the retraction of the latch bolt in remote locks, that is, locks on the other doors of the vehicle. Between the wall 1 and the locking lever 34 a plate 42 is slidable and carries at its outer end a pin 43 which projects through a passage 44 in the flange 2. The hairpin spring 41 which is coiled about the post 35 engages at its front end with the locking lever 34 and tends to swing it upwardly and at its rear end engages the abutment 45 formed on the plate 42, this spring tending to normally hold the plate 42 shifted inwardly with the outer edge of the guide slot 46 in the plate abutting the post 35. When the handle 20 of the master lock is turned in counter-clockwise direction to swing the cam lever 29 for releasing the retractor bar 24 from the latch bolt structure, the lever 29 at its lower end also abuts against the inner end of the pin 43 and the pin and the plate 42 are shifted outwardly. As will be explained more in detail later, such outward shift of the pin 43, acting through transmission mechanism provided in the stiles or posts between adjacent doors, will cause inward movement of pins in the remote locks for swinging of retractor bars in such remote locks away from the latch bolt structure therein so that at such remote locks the latch bolt structure cannot be retracted by turning of the outer handle.

When the key-controlled cam 36 of the master lock is turned for release of the locking lever 34, the cam lever 29 will be locked by the locking lever in set position to hold the plate 42 and pin 43 in outer position, and when the cam 36 is reset to swing down and release the locking lever from the cam lever the spring 41 will shift the plate 42 inwardly to cause retraction of the pin 43 and thereby release the locking means in the remote locks so that these locks can again be opened from the exterior.

For controlling the latch bolt operation from the inside of the door on which the lock structure is applied, a supporting plate 47 is secured to the door inwardly of the latch bolt supporting structure and another plate 48 is spaced from and secured to the main plate 47. These plates journal the shank 49 of an inner door handle 50 and the shank, between the plates, carries an arm 51 connected by a link 52 with the latch bolt plate 5, the connection being by means of a pin 53 on the link engaging in the longitudinal slot 54 in the latch bolt plate 5. When the handle 50 is swung in clockwise direction the resulting pull on the link by the arm 51 will shift the latch bolt plate 5 inwardly for retraction of the latch bolt head 4. When the inner handle 50 is in neutral position the pin and slot connection 53, 54 will permit retraction of the latch bolt structure by the outer handle 20.

When the inner handle 50 is swung a distance in counter-clockwise direction the latch bolt structure will be locked against retraction by the outer door handle and at the same time the pin 43 will be shifted outwardly for locking of the other lock latch bolts against retraction by their outer handles. This is accomplished by means of a slide plate 55 guided for longitudinal inward and outward movement on the wall 1 by pins 56 on the wall engaging in slots 57 in the slide plate. The slide plate at its inner end has the upward extension 58 in the path of the head 53' on the pin 53 so that when the link 52 is pushed by the counter-clockwise rotation of the inner handle the head 53' will abut the extension 58 and the slide plate 55 will be shifted outwardly to carry its end 59 into position below a finger 60 on the roll-back member 15 so that the roll-back member cannot be turned by the outer handle but will be dogged and therefore the latch bolt cannot be retracted. Also during outward movement of the slide plate 55 a shoulder 61 thereon engages with the inner end of the plate 42 and this plate will be shifted outwardly for outward projection of the pin 43 and consequent locking of the latch bolts of the remote locks against retraction by the outer handles.

Ordinarily, when the inside handle mechanism is operated for locking of the master lock the cam 36 will be in position for holding the locking lever 34 down so that the cam lever 29 will be in its normal position. Then when the dogging plate 55 is shifted inwardly by operation of the inside handle the upper edge thereof will come into position below the stop lug 62 on the cam lever thus locking the cam member 17 and the outside handle 20 against counter-clockwise movement, and as the roll-back member 15 is dogged against movement by the dogging plate 55 the outside handle will be rigidly held against any rotational movement. Should attempt be made to lock by operation of the inside handle when the master lock has already been set to locking position by counter-clockwise rotation of the outer handle and clockwise rotation of the cam lever 29, then the abutment 62 on the cam lever will be in front of the outer end of the dogging plate 55 and the inside handle cannot be actuated.

The inside handle mechanism is normally held in a neutral position by the force of a spring 63 anchored on the plate 48 and engaging at its end in a locking notch 64 provided in the hub of the arm 51. When the handle mechanism has been actuated for dogging of the lock roll-back, the spring 63 will be received in the notch 65 and the actuated parts will thus be held in set position. The spring 41 will resist the dogging movement of the inner handle structure but the force of this spring is overcome by that of the spring 63 and the parts will be held in set position until the inner door handle is swung back to release the arm 51 from the spring 63 and then both springs will function to assist in returning the inner handle structure back to normal position. An auxiliary spring 66 may be provided on the plate 48 for engaging with and adding its pressure to the spring 63.

When the inner door handle is rotated in clockwise direction for pull on the link 52 to retract the latch bolt structure the cylindrical portion of the hub of the arm 51 will be engaged by the spring 63 without locking of the arm, and then when the inner handle is released the spring 8 will function to return the latch bolt, the link 52 and the inner handle mechanism to normal position.

Thus, with the arrangement disclosed on Figure 1, locking from the outside of the door is accomplished by first turning the key for release of the locking lever 34 from the cam 36 and then turning of the handle 20 in counter-clockwise direction for swing of the cam lever 29 to free the retractor bar 24 from the latch bolt structure, this locking condition being then maintained by the engagement of the locking lever 34 with the cam lever. To unlock from the outside the key is turned for swing of the cam 36 to release the locking lever 34 so that the spring 31 may reset the retractor bar 24 to unlocking position, that is, with its inner end in front of the abutment flange 10 on the latch bolt plate 5. The locking by the inner handle mechanism is accomplished by dogging of the lock roll-back 17 against movement by the outer handle in a manner which has been explained above.

Figure 4:
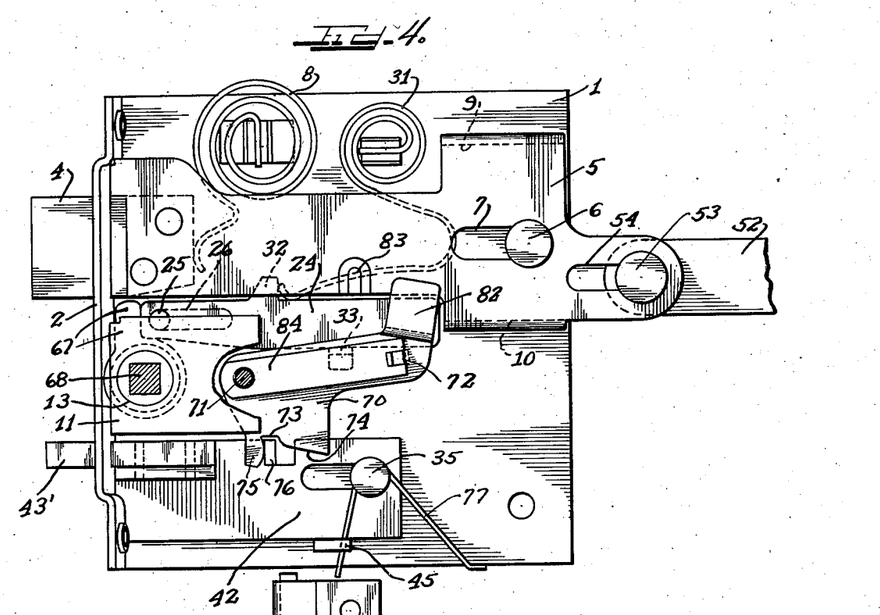
Figure 4 is a side elevation of a remote lock for cooperation with and control by the master lock of Figure 1.

On Figure 4 is shown the lock structure slightly modified for service on the remote vehicle doors, that is the doors other than the door on which the master lock is applied.

The structural parts in the lock of Figure 4, which are the same as the structural parts in Figure 1, have been given the same reference numerals. In the structure of the remote lock the cam element 17 of the master lock structure has been omitted and the roll-back member 67 is journalled by its hubs in the openings 12 and 13 in the supporting wall 1 and the cover plate 11 respectively, the roll-back member having a polygonal opening for receiving the shank or stem 68 of the outer handle (not shown) for the door so that upon turning of the handle the roll-back is directly rotated for engagement of its arm with the outer end of the retractor bar 24 whose inner end is normally in position in front of the abutment flange 10 on the latch bolt structure plate 5. Locking of the latch bolt structure against retraction by the outer handle 69 is accomplished by freeing the retractor bar 24 from the latch bolt, such movement resulting from inward shift of the pin 43' on the plate 42, such inward shift being, as has already been explained, caused by the outward movement of the pin 43 in the master lock by way of transmission mechanism within the post or stile between adjacent doors.

In place of the cam lever 29 in the master lock shown in Figure 1, a bellcrank-shaped lever 70 is provided in the remote lock and supported by the pin 71 journalled in the wall 1 and the cover plate 11. At its inner end this lever has the abutment extension 72 for engaging with the under edge of the retractor bar 24 so that when the lever is swung in counter-clockwise direction the retractor bar will be swung upwardly to raise its inner end above the abutment flange 10 on the latch bolt structure. At its lower end the lever has a notch 73 inwardly of which the lower edge of the lever forms an inclined or cam surface 74, and outwardly of which notch the lever has the abutment finger 75, the notch normally receiving the abutment extension 76 deflected from the plate 42 from which the finger 43' extends.

Figure 4 shows the parts in unlocked position, the pin 43' being held in projected position by the force of a hairpin spring 77 coiled about the post 35 with one end anchored around the edge of the wall 1 and the other end engaging the abutment deflection 45 on the plate 42. In such normal position the abutment 76 on the plate 42 is within the notch 73 and against the finger 75 on the lever 70 to hold this lever released from the retractor bar 24 which seats against its rest 33 so that when the door handle is turned in clockwise direction the retractor bar will engage with the latch bolt structure for retraction thereof. However, should the pin 43' be shifted inwardly, the abutment 76 on the plate 42 will engage with the cam edge 74 of the lever 70 and the lever will be swung upwardly for engagement of its abutment 72 with the retractor bar to shift the retractor bar to locking position, that is free from the latch bolt structure so that when the door handle is then turned the retractor bar will merely shift longitudinally but will not retract the latch bolt. Upon release of the pin 43', the spring 77 will shift the plate 42 back to its outer position so that the engagement of the abutment 76 with the finger 75 on the lever 70 will swing the lever downwardly for release of the retractor bar, which bar is then swung down to its normal position by the force of the spring 31 so that the latch bolt may now be withdrawn by rotation of the door handle. Upon release of the door handle the spring 31, by abutting the extension 32 on the retractor bar, will shift the bar outwardly to its normal position, and the spring 8 will shift the latch bolt structure back to its latching position.

In connection with the remote door lock structure the same inner handle mechanism could be provided as that shown in connection with the master lock structure on Figure 1, the handle mechanism being connected by link 52 with the latch bolt structure through the pin and slot connection 53, 54. When the handle is swung the latch bolt structure will be shifted inwardly to unlatching position and then when the handle is released the spring 8 will return the latch bolt to latching position.

Figure 10:
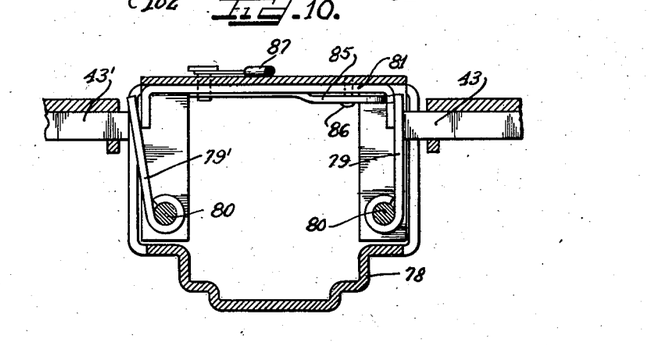
Figure 10 is a transverse section of a stile between adjacent doors showing the transmission means for transmitting control movement of a master lock to a remote lock.

The transmission of the movement of the pin 43 of the master lock to the pin 43' of the lock in the door adjacent to the master lock door, is shown on Figure 10. At the sides of the post 78 between the adjacent door levers 79 and 79' are pivoted at their outer ends by pins 80 for horizontal swing, a transmission bar 81 slidable on the rear wall of the stile being interposed between the ends of the levers. The lever 79 is in alignment with the pin 43 of the master lock structure and the lever 79' is in alignment with the pin 43' of the remote lock so that when the pin 43 is shifted outwardly the pin 43' will be shifted inwardly for locking of the respective latch bolts against unlatching movement by the respective outer door handles.

Figure 10 shows the master lock pin 43 out and the pin 43' of the remote door in so that the locks are in locking position. It may be that an occupant of the vehicle in which the locks are all set to locking condition, may desire to leave the vehicle by way of one of the remote doors but he does not want to lock himself out. With the structure thus far described in connection with the remote lock (Figure 4), when the occupant withdraws the latch bolt by operation of the inner door handle and he swings the door open, the pin 43' will be released from the transmission lever 79' and the pin will be shifted outwardly and cause downward swing of the cam lever 70 and release of the retractor bar 24 to unlocking position, but as soon as the door is slammed shut the pin 43' will again be shifted inwardly by its engagement with the transmission lever 79' and the retractor bar 24 will be restored to locking position. To prevent such locking movement an offset wing 82 is provided on the inner end of the lever 70 and on the latch bolt plate 5 a cam hump 83 is provided in advance of the wing 82. The connection of the lever 70 with the pin 71 is sufficiently yielding so that the lever may be swung forwardly out of its locking plane, a flat spring 84 anchored at the pin and engaging against the inner end of the lever tending to hold it in its inner position. Now when the latch bolt is withdrawn by operation of the inner door handle the cam hump will engage with the wing 82 and swing the lever 70 forwardly to withdraw its abutment 72 from below the retractor bar 24 and the spring 31 will then swing the retractor bar down against its rest 33 to unlocking position with its inner end in alignment with the abutment flange 10 on the latch bolt plate 5. As the door is now swung open and the handle is released, the latch bolt will be shifted outwardly by the spring 8 and the lever 70 will be released from the cam hump 83 and the spring 84 will hold the lever against the front face of the retractor bar. Also while the door is being swung open the pin 43' is released from the transmission lever 79' and is shifted outwardly by the spring 77, such outward shift of the pin and its supporting plate 42 causing engagement of the abutment 76 with the lower end of the lever 70 and downward swing of the lever back to normal position with its abutment 72 below the lower edge of the retractor bar. When the door is now slammed shut after the occupant has left the vehicle, the pin 43' and its supporting plate 42 will be re-shifted inwardly by the engagement of the pin with the transmission lever 79' and the lever 70 will be swung upwardly and the retractor bar raised to its locking position, but at the same time the latch bolt is shifted inwardly by the engagement of its head 4 with the keeper (not shown) on the stile 78 and the cam hump 83 engages the wing 82 to swing the lever 70 forwardly for release of the retractor bar so that the bar is again swung down to unlocking position by the spring 31 and therefore the door will remain open for re-entry by the occupant. Re-locking of the remote door is then accomplished by actuation of the inner door handle for the master lock, first to unlock the master lock so that the pin 43' of the remote lock may shift outwardly for return of the lever 70 to normal position, and then actuation of the master lock inner handle for re-locking of the master lock and the resultant inward movement of the pin 43' of the remote lock for upward swing of the lever 70 and return thereby of the retractor bar to locking position.

Referring to Figure 10, the movement of the transmission lever 79 controlled by the master lock pin 43 may be communicated to a suitable lever 85 pivoted at 86 to the post 78 and the movement of the lever transmitted by a cable 87 to transmission means between the adjacent doors on the opposite side of the vehicle so that all the remote door locks may be controlled by operation of the master lock in a manner such as is disclosed in my copending applications referred to herein.

Figure 5:
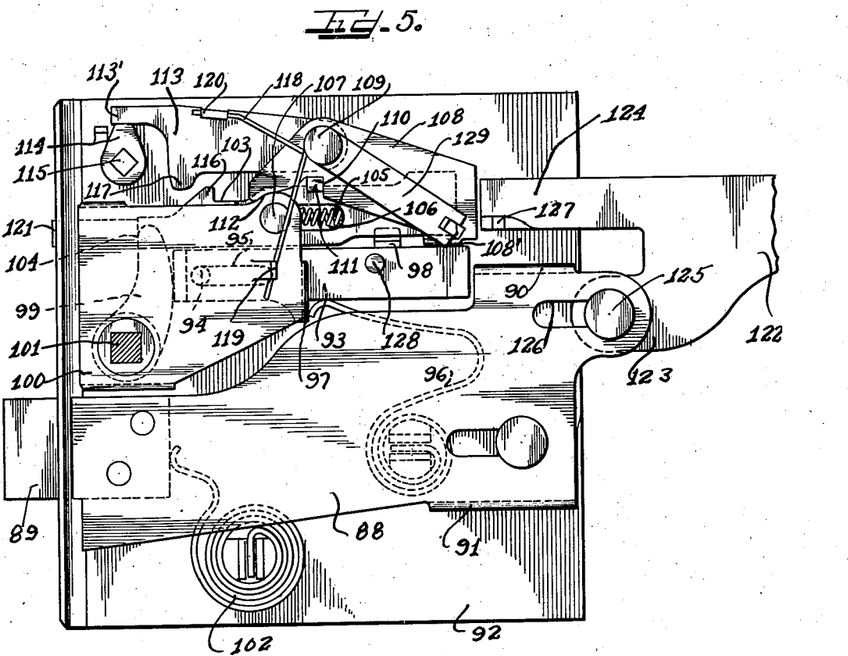
Figure 5 is a side elevation of a modified form of master lock.

Figure 5 shows a modified arrangement for a master lock. Here the latch bolt structure is at the bottom of the lock and the controlling means at the top thereof. The latch bolt plate 88 supports the latch head 89 and at its inner end has the upper and lower rearwardly extending flanges 90 and 91 engaging the supporting wall 92, the upper flange 90 forming an abutment for the retractor bar 93 which at its outer end has a pivot pin 94 guided by the slot 95 in the wall 92. The spring 96 engages against the lower edge of the retractor bar and against the bar abutment projection 97 and tends to hold the bar in its outer position and upwardly against its rest 98.

The roll-back 99 is supported between the wall 92 and a closure plate 100 and has a polygonal opening for receiving the shank 101 of the outer door handle, the end of the roll-back being engageable with the inner end of the retractor bar when the handle is turned in clockwise direction (Figure 5), such rotation shifting the bar 93 inwardly against the abutment flange 90 on the latch bolt plate for shifting of the latch bolt structure to unlatching position. A spring 102 returns the latch bolt structure to its latching position upon release of the handle.

Above the retractor bar 93 an actuator plate 103 is slidable horizontally on the wall 92 and in advance of the roll-back has an abutment 104 whereby, upon counter-clockwise rotation of the roll-back, the actuator plate may be shifted outwardly. A spring 105 abuts the inner end of a slot 106 in the actuator plate and at its other end abuts a guide post 107 secured to the wall 92 and extending through the slot, the spring tending to hold the actuator plate in inner position. Above the actuator plate a cam lever 108 is pivoted intermediate its ends on a post 109 extending from the wall 92, this lever in its under edge having a slot 110 for receiving the extension or tooth 111 on the actuator plate 103, the lower edge of the lever outwardly of its notch 110 having the cam surface 112. On its under edge at the inner end thereof the lever 108 has the rearward deflection 108' positioned above the retractor bar 93 for engagement with the upper edge thereof.

Behind the lever 108 and in alignment with the actuator plate 103 a locking lever 113 is pivoted at its inner end on the post 109 and has a finger 113' at its upper corner for engagement by a cam 114 on the shank 115 which at its outer end, that is on the outer side of the door, is connected with a key-controlled lock cylinder (not shown) whereby the shank and the cam may be turned. At its lower edge and in advance of a tooth 116 extending upwardly from the actuator plate 103 the locking lever has the latch extension 117. When the cam 114 is swung upwardly by operation of the controlling key and into engagement with the finger 113', the locking lever 113 will be raised to withdraw its latch end 117 from the path of the tooth 116 on the actuator plate, but when the cam is swung down the locking lever will drop to project its end 117 into the path of the tooth 116 so that when the actuator plate is shifted outwardly the latch end will drop behind the tooth 116 and so lock the plate in its outer position. A spring 118 anchored on the post 109 and against a stop 119 deflected from the plate 100 engages at its other end the abutment 120 on the locking lever and tends to hold this lever swung downwardly.

When it is desired to lock the latch bolt structure against retraction by means of the handle from the outside of the lock structure, the key is first turned to swing the cam 114 downwardly to release the locking lever 113. The outer handle is then rotated in counter-clockwise direction for engagement of the roll-back 99 against the abutment 104 on the actuator plate for outward shift of the plate, such outward shift moving the abutment tooth 111 out of the notch 110 and along the cam edge 112 of the cam lever 108 so that the inner end of the lever will swing downwardly to carry its abutment 108' against the retractor bar 93 to swing this bar downwardly to a position with its inner end below and free of the abutment flange 90 on the latch bolt plate 88. After outward shift of the actuator plate the latch end 117 of the locking lever will have dropped behind the tooth 116 and the actuator plate will be held in its outer position and the retractor bar will be held in its lower position free of the latch bolt structure so that when the handle is turned in clockwise direction the retractor bar will be shifted longitudinally inwardly but as the bar is free of the latch bolt structure, the latch bolt structure will not be retracted. To unlock, so that the latch bolt structure may be unlatched, the key is turned to swing the cam unlatched 114 against the finger 113' for raising of the locking lever 113 for release of the actuator bar and the spring 105 will then shift the bar back to its inner position, the engagement of the tooth 111 on the actuator bar with the inner edge of the notch 110 then causing the lever 108 to be swung upwardly at its inner end for release of the retractor bar so that the spring 96 may move the bar back to its unlocking position.

The actuator bar 103 terminates at its outer end in a pin 121 which, when the actuator bar is shifted outwardly, cooperates with transmission mechanism within a stile post for actuation of the lock controlling pin in a remote lock in a manner which has already been explained hereinbefore, so that upon locking of the master lock the locks on remote doors may simultaneously be locked.

The inner handle mechanism for controlling a lock structure shown in Figure 5 may be the same as that shown on Figure 1, the movement of the inner handle being transmitted by a link 122. This link has lower and upper ends 123 and 124, the lower end carrying a pin 125 engageable in the slot 126 in the latch bolt plate 88 so that by turning of the inner handle in clockwise direction (Figure 1), the pull on the link 122 will shift the latch bolt structure 88 inwardly for unlatching of the door.

The upper end 124 of the link is in alignment with and normally a short distance from the inner end of the actuator bar 103. If it is desired to lock the doors by operation of the inner handle associated with the master lock, the inner handle is swung in counter-clockwise direction (Figure 1), the end 124 of the link 122 then engaging with the end of the actuator bar 103 and shifting this bar outwardly for projection of its pin 121 for causing locking of the remote locks. Outward shift of the actuator bar, by engagement of the bar abutment 111 with the cam edge 112 of the lever 108 will tend to cause the inner end of this lever to swing down for engagement of the abutment 108' with the retractor bar to swing the bar to locking position clear of the abutment flange 90 on the latch bolt structure and the master lock latch bolt would then be locked against unlatching by the rotation of the master lock outside handle. However, means are provided for locking the retractor bar against inward shift by the roll-back 99, this being accomplished by a cam hump projection 127 on the front face of the link end 124, this cam projection, when the link 122 is shifted inwardly, engaging against the rear side of the inner end of the cam lever 108 to swing the lever forwardly sufficiently to clear its abutment 108' from the retractor bar 93 so that when the link end 124 engages with and shifts the actuator bar 103 outwardly the lever 108 will swing downwardly but with its abutment 108' in front of the retractor bar so that the retractor bar will not be swung downwardly, and the outer end of the lever abutment 108' will be brought into position in front of a stop pin 128 on the retractor bar and the bar thus held against inward shift and the roll-back 99 will be blocked against inward swing. When the link 122 is withdrawn by operation of the inner handle mechanism the spring 105 will restore the actuator bar 103 and the cam lever 108 to their normal positions.

The forward swing of the cam lever 108 is made possible by having its mounting on the post 109 provided with sufficient clearance, and a spring 129 anchored on the post and engaging the inner end of the lever will tend to hold the lever in its normal rear position with its abutment 108' above the upper edge of the retractor bar 93.

Figure 6:
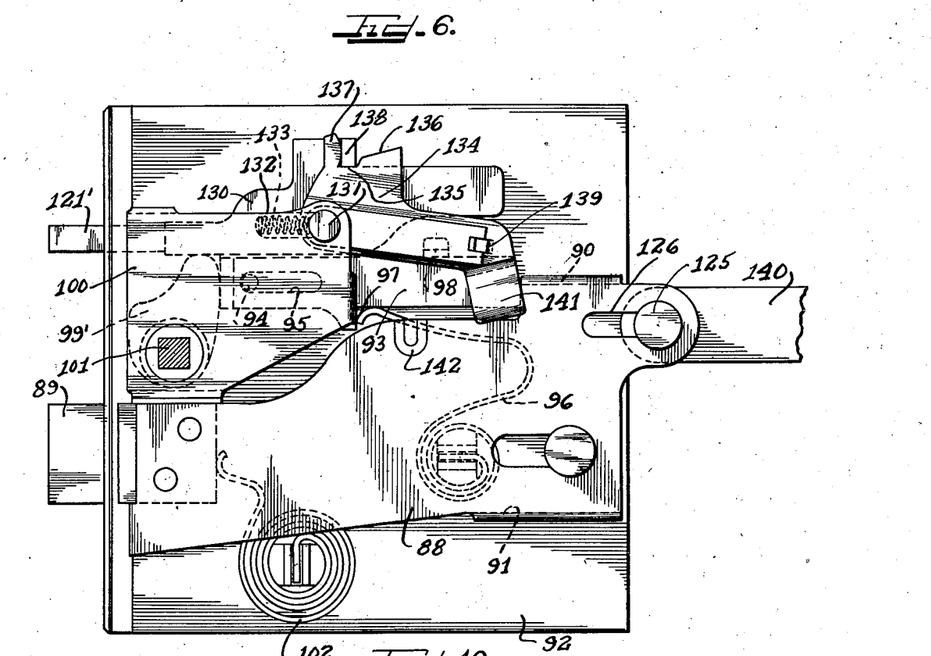
Figure 6 is a side elevation of a remote lock for association with and control by the master lock of Figure 5.
Figure 8:
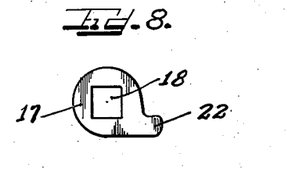
Figure 8 is a side elevation of the roll-back actuating cam member in the lock of Figure 1.
Figure 9:
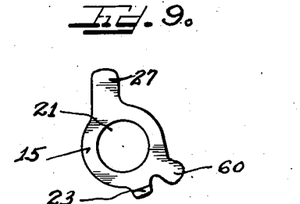
Figure 9 is a side elevation of the roll-back member of the lock of Figure 1.

Figure 6 shows a modified arrangement for a remote door lock for association with the master lock shown on Figure 5. The parts on Figure 6 which are the same as the parts on Figure 5 are given the same reference characters and the modified parts are given different reference characters. The actuator plate 130 above the retractor bar 93 has the pin 121' extending from its outer end for engagement by the actuator pin 121 in the master lock (Figure 5). The actuator plate is guided by a post 131 extending through the slot 132 in the plate, a spring 133 between the outer end of the slot and the post tending to hold the plate and the pin in outer position. Pivoted on the post 131 is the bell-crank-shaped cam lever 134 which is in front of the actuator plate 130 and has a notch 135 in its upper edge to the inner side of which the lever has the cam surface 136, an abutment finger 137 being at the outer side of the notch, and abutment 138 on the actuator plate 130 extending forwardly into the notch. At its inner end the lever 134 has an abutment ear 139 deflected rearwardly thereof for engagement with the upper edge of the retractor bar 93 so that when the lever is swung downwardly the retractor bar will also be swung downwardly about its pivot 94 to carry its inner end below the abutment flange 90 on the latch bar structure so as to free the retractor from the latch bolt structure. When the actuator plate is shifted inwardly by the engagement of its pin 121' by the pin 121 of the master lock (Figure 5) the abutment 138 on the actuator plate will engage with the cam edge 136 to swing the cam lever 134 down for engagement of its abutment 139 with the retractor bar so that this bar will be swung down to clear the latch bolt structure. With this position of the parts, when the roll-back member 99' is swung in clockwise direction by corresponding turning of the outer handle on the shank 101, the retractor bar 93 will be shifted longitudinally inwardly but, as its inner end is held below the abutment flange 90, the latch bolt structure will not be retracted and opening of the doors will thus be prevented from the outside thereof. When the actuating pin 121 of the master lock (Figure 5) is withdrawn, the pin 121' of the remote lock (Figure 6) will be released so that the spring 133 may return the actuator plate 130 to its normal outer position, such return movement resulting in engagement of the actuator plate abutment 138 with the finger 137 on the cam lever and upward swing of the cam lever to normal position and release of the actuator bar which will then, by its spring 96, be swung upwardly to normal unlocking position in which position it will engage with the latch bolt structure when the roll-back is swung in clockwise direction.

When the doors are all locked and an occupant of the vehicle desires to leave by way of one of the remote doors the latch bolt structure is first retracted by pull on the link 140 connected with the inside handle mechanism on the door, which inside handle mechanism may be the same as that disclosed in Figure 1. When the door is swung open the actuator pin 121' will be released from the post between the adjacent doors and the outwardly shifting actuator plate 130 will swing the cam lever 134 upwardly for release of the actuator bar 93 which is then swung up to unlocking position. When the door is slammed shut the pin 121' will again be shifted inwardly and the inwardly shifting actuator plate 130 will swing the lever 134 downwardly. To prevent the cam lever from swinging the retractor bar 93 back to locking position the cam lever is provided at its inner end with a forwardly offset wing 141 which will be engaged by the cam hump 142 on the latch bolt structure plate 88 as the latch bolt structure is shifted inwardly when the door is slammed shut and the cam lever 134 will therefore be swung forwardly so that its abutment 139 will be released from the upper edge of the retractor bar and the retractor bar will be free to be swung upwardly by its spring 96 to unlocking position. The door is then unlocked so it may be opened by turning of the handle for re-entry into the vehicle. To re-lock the door, the inside handle of the master lock (Figure 5) is first actuated for unlocking of the master lock and release of the remote lock actuator pin 121' so that the actuator plate 130 may shift outwardly for upward swing of the cam lever to return its abutment 139 into position above the upper edge of the retractor bar 93 and then the inside handle mechanism for the master lock is operated for re-locking of the master lock and inward shift of the pin 121' of the remote lock for downward swing of the cam lever 134 and downward swing of the retractor bar to locking position.

I have shown and described a practical and efficient embodiment of the various features of my invention, but I do not desire to be limited to the exact construction, arrangement and operation referred to as changes and modifications may be made which will still come within the scope of my invention.

I claim as my invention:

1. In lock structure of the class described, a latch bolt, a roll-back and turning means therefor, a retractor element normally positioned to form a connection between said rollback and said latch bolt for retraction of said latch bolt when the rollback is turned by said turning means, a cam element operable by said turning means independently of said rollback to shift said retractor element to break said connection whereby to lock said latch bolt against retraction by said rollback, and means for holding said cam element in such connection breaking position.

2. In a lock structure of the class described, the combination of a latch bolt, a roll-back, turning means adapted when turned in one direction to cause turning of said roll-back, a retractor element operable by said roll-back and normally positioned to engage said latch bolt for retraction thereof when said roll-back is turned by said turning means, disconnecting means operable upon turning of said turning means in reverse direction independently of movement of said roll-back for causing disconnection of said retractor element from said latch bolt, and releasable means for holding said disconnecting means in disconnecting position.

3. In a lock structure of the class described, a latch bolt, a handle structure, an actuating element mounted on said handle structure to turn therewith, a roll-back associated with said actuator element, a retractor element operable by said roll-back and normally positioned to form a connection between said roll-back and said latch bolt, means whereby turning of said handle structure in one direction will cause operation of said roll-back to operate said retractor element for retraction of said latch bolt, a cam element and means whereby rotation of said handle structure in reverse direction will actuate said cam element independently of movement of said roll-back for shifting said retractor element to break said connection whereby to lock said latch bolt against retraction by said roll-back, and means for holding said cam element in connection breaking position.

EDWARD D. DALL.